(No Model.)
C. W. LANPHER.
BRAKE FOR LOCOMOTIVES AND TENDERS.
No. 275,831. Patented Apr. 17, 1883.
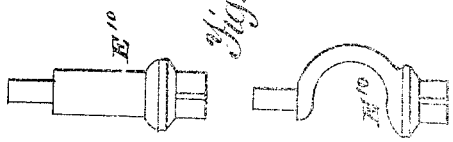
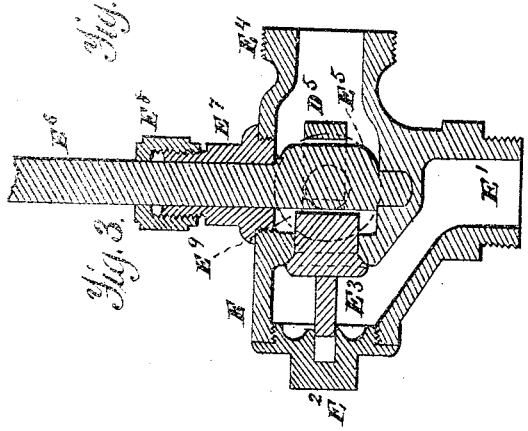
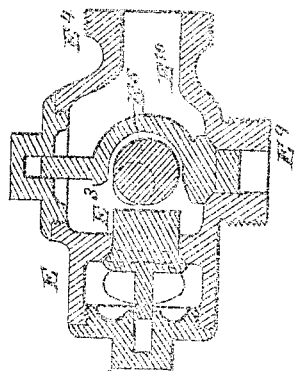
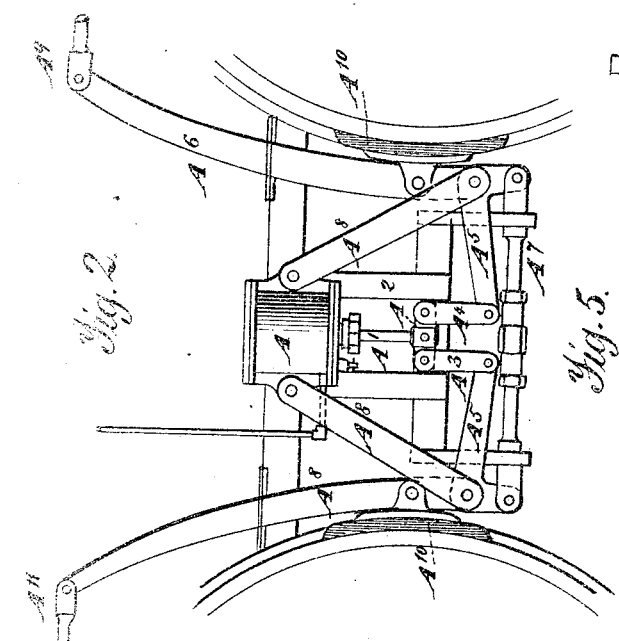
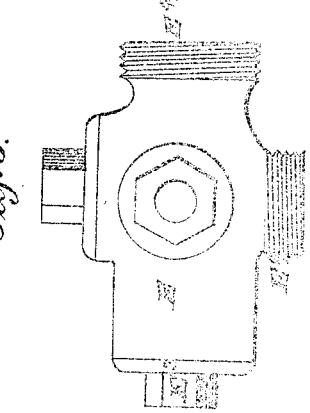
Witnesses.
A. Ruppert.
W. Schaffer.
C. W. Lanpher
Inventor
Holloway & Holloway
Attys (No Model.)　　　　　　　　　　　　　　　　3 Sheets—Sheet 3.
C. W. LANPHER.
BRAKE FOR LOCOMOTIVES AND TENDERS.
No. 275,831.　　　　　　　　　Patented Apr. 17, 1883.
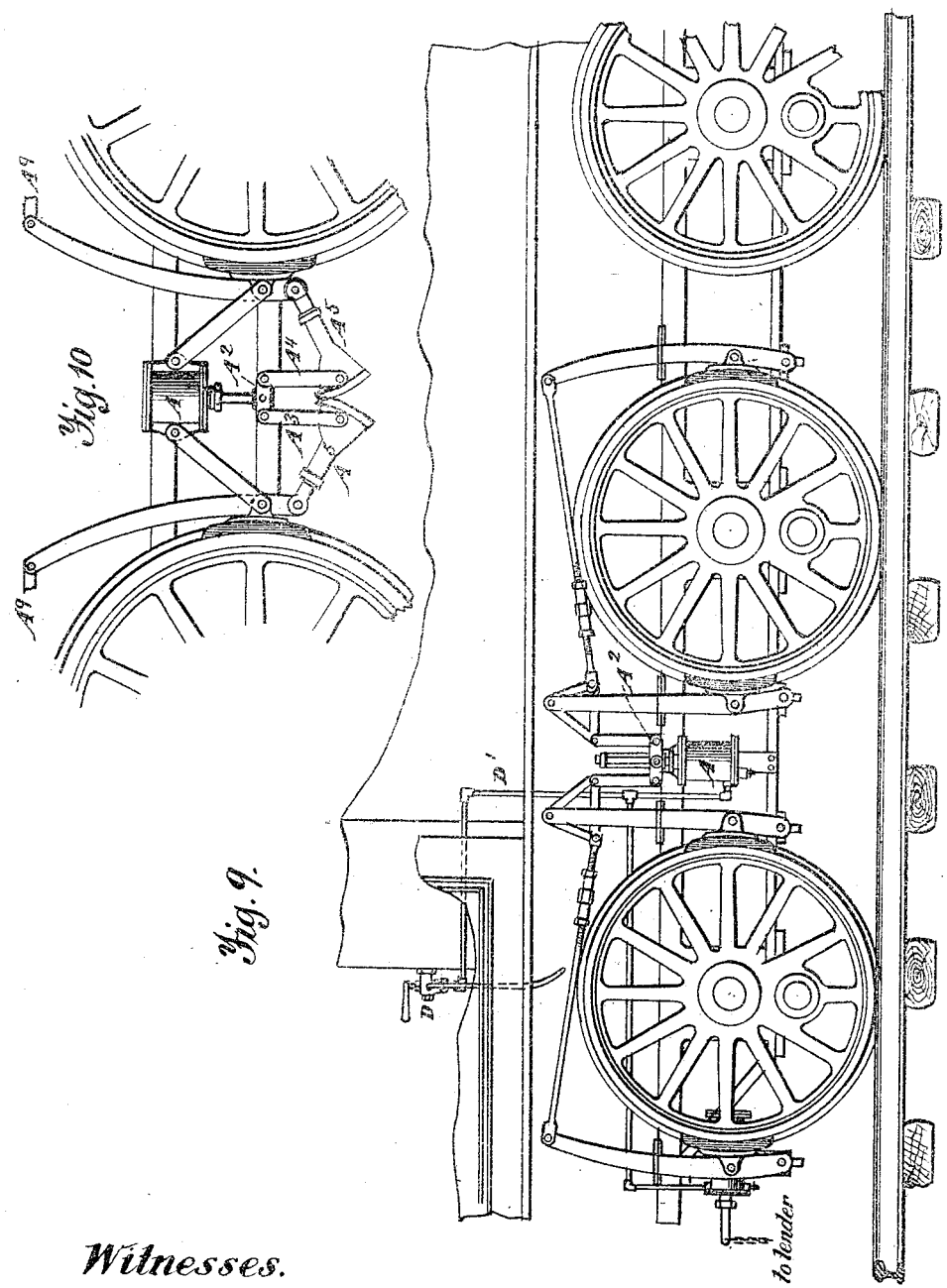
Witnesses.
A. Ruppert,
W. E. Chaffee.
C. W. Lanpher,
Inventor.
Notterway & Blanchard
Att'ys

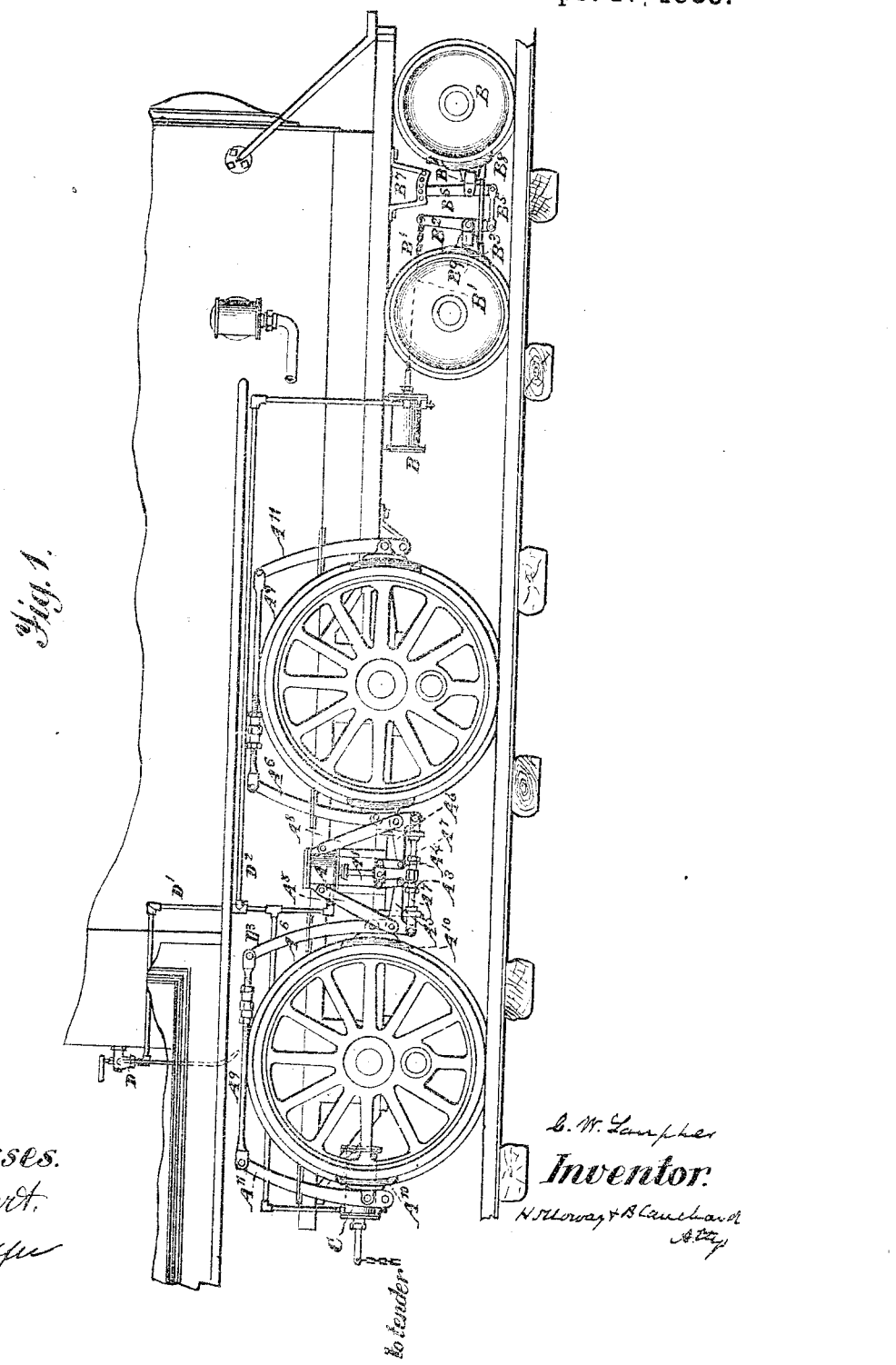

UNITED STATES PATENT OFFICE.

CHARLES W. LAUPHER, OF NORWICH, NEW YORK.

BRAKE FOR LOCOMOTIVES AND TENDERS.

SPECIFICATION forming part of Letters Patent No. 275,831, dated April 17, 1883.

Application filed June 7, 1882. (No model.)

*To all whom it may concern:*

Be it known that I, CHARLES W. LAUPHER, a citizen of the United States of America, residing at Norwich, in the county of Chenango and State of New York, have invented certain new and useful Improvements in Brakes for Locomotives and Tenders, of which the following is a specification, reference being had therein to the accompanying drawings.

My invention relates to brakes for locomotive-engines and their tenders; and the object thereof is to provide such a construction, combination, and arrangement of the parts composing the brake mechanism as will enable the engineer or person in attendance to apply brake-blocks to the driving-wheels of such engines, to their truck-wheels, and to the wheels of the tender simultaneously, or nearly so, by the manipulation of a suitable valve arranged for that purpose.

I am aware that it is not new, broadly, to apply brakes to all of the wheels of a locomotive and its tender, such an application being shown in English Patent No. 262 of 1870, and in American Patent No. 175,417, dated March 28, 1876. I do not therefore claim such application, but limit my invention to the combinations herein claimed and their equivalents.

I attain the objects of my invention by the devices, their combinations and arrangements, illustrated in the accompanying drawings, in which—

Figure 1 is an elevation showing so much of a locomotive-engine as is necessary to illustrate the application thereto of my invention, it showing three steam or air cylinders, one for operating the brakes of the driving-wheels, one for operating the brakes of the truck-wheels, and one for operating the brakes which are applied to the wheels of the tender. Fig. 2 is an elevation upon an enlarged scale, showing the mechanism for applying the brake to the inner surface of the driving-wheels. Figs. 3, 4, 5, 6, 7, and 8 are detail views, showing in elevation and section the parts of a valve for controlling the flow of steam or air to and from the brake-cylinders. Fig. 9 is an elevation showing a modified form of devices for operating the brake-blocks, and Fig. 10 shows a further modification.

Similar letters refer to similar parts throughout the several views.

The importance of proper provision for arresting the movements of a railroad-train in the shortest possible period of time is well known, and for the accomplishment of this purpose many plans have been devised. Some of these have consisted of brakes applied to the wheels of locomotives, which have been operated by steam, others by compressed air, and yet others by atmospheric pressure, operating upon the opposite side of a piston to that from which the air had been exhausted by a pump or steam jet. The more usual method of arresting the movements of trains, however, has been by applying brakes to the wheels of the cars by hand, or by the use of steam or compressed air, or by exhausting the air from a cylinder or a flexible receptacle, thus making available atmospheric pressure. Recent experience has demonstrated the advisability, if not the necessity, of applying as much of the retarding force as is possible to the engine and its tender—first, because there is usually more weight per wheel resting upon them than upon the cars, and consequently a greater amount of retarding force can be applied to them without causing them to "skid" or slip upon the rails than the cars will admit of; secondly, by applying the greater amount of the retarding force to the wheels of the engine and tender, less strain and twitching are caused upon the cars.

In making a practical application of my devices there is provided for applying the brakes to the driving-wheels a cylinder, A, which is attached to the frame of the engine, between the driving-wheels, or to the boiler, it being provided with a piston of any suitable form of construction, and with a piston-rod, A', to the end of which a cross-head, A², is secured, to the outer end of which links A³ A⁴ are pivoted, the outer ends of which connect by pivoted joints with levers or arms A⁵ A⁵, which are pivoted to brake-applying levers A⁶ A⁶, the lower ends of which are pivoted to an adjustable rod, A⁷, which is capable of being lengthened or shortened for the purpose of adjusting the positions of the brake-shoes with reference to the periphery of the wheels, said levers A⁶ A⁶ being suspended upon links A⁸ A⁸, the upper ends of which are pivoted to flanges formed upon the cylinder A, as shown in Figs. 1 and 2. To the upper ends of the levers $A^6 A^6$ there are pivoted rods $A^9 A^9$, which have in them sockets and nuts for the purpose of providing for lengthening or shortening them, by which means a further provision for the adjustment of the brake-shoes is furnished. The lower ends of the levers $A^6 A^6$ are pivoted to a bracket attached to the frame of the engine, outside of the driving-wheels, the same means being provided for suspending and carrying the adjustable rod, to which the lower ends of the levers between the wheels are secured.

The arrangement of the parts above described is such that as steam from the boiler, or it may be compressed air from a reservoir placed underneath the foot-board of the engine or in any other convenient locality, is admitted to the cylinder A beneath its piston, said piston and its rod will be forced upward, and will carry with them the inner ends of the levers or arms $A^5 A^5$, the effect of which will be to press apart the lower ends of the levers $A^6 A^6$, and thus apply the shoes $A^{10} A^{10}$ to the wheels, in doing which the upper ends of said levers will be made to approach each other, which will have the effect to cause the upper ends of levers $A^{11} A^{11}$ to approach each other, they being operated by the rods $A^9 A^9$, which have one of their ends connected to said levers, as shown in Fig. 1. By this arrangement of parts the engineer is enabled to apply brake-shoes to eight points of the driving-wheels of an engine, supposing that the mechanism is applied to both sides thereof, which is feasible, and may be done, if desired, said points being by preference at or below the center of said wheels.

The levers above alluded to are so proportioned that the force exerted by the piston is equally divided, one half being transmitted to one wheel and the other half to the other, it being so divided between the brake-shoes in equal amounts and applied to opposite sides of the wheels, and consequently when the brakes are applied the wheels are forced to or kept in their central positions, thereby avoiding any undue strain upon the side rods or crank-pins of the engine, which I regard as an important feature in my invention.

In providing for the application of brakes to the truck-wheels of the engine simultaneously, or nearly so, with the application of the driving-wheel brakes, I place upon the frame of the engine, or to a bracket attached thereto between the truck and driving wheels, or in any other convenient location, a cylinder, B, which is provided with a piston and a piston-rod, to the outer end of which there is attached a chain or wire rope, $B'$, the opposite end of which is secured to a lever, $B^2$, which is pivoted to a brake-beam carrying a brake-shoe, $B^3$. Said beam extends across the truck, and carries upon its opposite end a shoe, which presses upon the opposite wheel. To the lower end of lever $B^2$ a connecting-rod, $B^5$, is attached, the opposite end of which is pivoted to a swinging arm, $B^6$, the upper end of which is held in bracket $B^7$, which has in it a series of holes, in order that the upper end of said arm may be longitudinally adjusted thereon, for the purpose of causing the brake-blocks to assume the proper positions with reference to the wheels. The pivotal point of the arm $B^6$ is in the shoe $B^3$, or in a stud attached thereto, said block being carried upon a lever, $B^9$, which extends across the truck and carries a shoe upon its opposite end. By this arrangement brakes are applied to the inner surfaces of all the wheels of the truck, and in order that the force may be applied to all of the wheels equally it may become advisable to suspend the cylinder B at or near the center of the space between the frames of the engine.

In making provision for applying brakes to the wheels of the tender there is provided a cylinder, C, which I prefer to attach to the frame of the engine underneath the foot-board, but which may be placed in any other convenient locality on the engine-frame. This cylinder is also provided with a piston and piston-rod, a chain or rope being attached to the outer end of the latter, which extends therefrom to the usual or any approved form of lever and its connections for applying the brakes to all of the wheels of the tender.

It is apparent that as a consequence of the combination of the three cylinders and the mechanism operated thereby the brakes can be simultaneously, or nearly so, applied to two of the driving-wheels of an engine and to all of the wheels of its truck and tender, and that by applying the said mechanism to the opposite side of the engine all of its wheels can be acted upon. In making provision for this method of operating brakes it is important that the arrangement of devices for controlling the flow of steam or air to the various cylinders should be such as to cause it to enter all of them at the same time, or as nearly so as is possible; and in order that this may be done a valve, D, is attached to the steam-space of the boiler, which is so constructed that by a proper manipulation thereof steam will be admitted to a pipe and its branches, which will thus conduct it. Said valve, by a further manipulation thereof, will allow the steam to escape from said cylinder by returning through the conducting-pipe to the valve D and out through the relief port thereof, said cylinder being provided with drip cocks or valves opening inward for allowing the water of condensation to pass out, said opening movement being caused by a spring arranged upon the stem of the valve, and the closing movement by the pressure of the steam or air in the cylinders. To the valve just alluded to there is connected a pipe, $D'$, which conducts steam to the lower end of cylinder A. To this pipe there is attached at any suitable point a branch, $D^2$, which conducts a portion of the steam passing the valve D, as shown in Figs. 1 and 9, to the cylinder B, which operates the brake upon the truck-wheels. Another branch pipe, $D^3$, is connected to the pipe D at such convenient point as to cause it to conduct a portion of the steam to the cylinder C, one arrangement of said pipe being shown in Fig. 1; but the arrangement may be varied to suit different forms of engines.

The form of valve which I prefer to use for controlling the flow of steam to the brake-cylinder and its eduction therefrom is shown in detail by Figs. 3, 4, 5, 6, 7, and 8, Fig. 5 showing it in elevation, Figs. 3 and 7 in section, and Figs. 6, 4, and 8 in detail, E being the case in which the operating parts are inclosed, one of its nozzles being provided with a screw-thread, E', for attaching it to the boiler or to a reservoir for compressed air, and another with a cap, $E^2$, which screws into the case, and is provided with an aperture which forms a guide for the stem of a valve, $E^3$, which, when open, permits steam or air to flow through the nozzle $E^4$ to the conducting-pipe D', said valve being moved by an eccentric, $E^5$, its actuating-rod $E^6$ passing out through a cap, $E^7$, secured to the case and being surrounded by a packing-box, $E^8$, its outer end being provided with a crank or wheel for turning it. The eccentric $E^5$ is within the case E, the inner end of its shaft or rod having a bearing in an aperture formed therein. For the purpose of allowing the steam or air to pass out of the cylinders when the brakes are to be released, there is placed in the case E another valve, $E^{10}$, the stem of which is curved, as shown in Figs. 7 and 8, within which curvature the eccentric $E^5$ works. The arrangement of the parts of this valve is such that when the brakes are not to be applied the steam or air will hold the valve $E^3$ upon its seat, as shown in Figs. 3 and 7; but when they are to be applied the valve $E^3$ is forced from its seat by the turning of the eccentric, and thus it is allowed to pass said valve and out through the nozzle $E^4$ to the cylinders, the pressure at such times holding the valve $E^{10}$ upon its seat. When the brakes are to be released the eccentric is to be turned into such a position as to permit the valve $E^3$ to be forced to its seat and at the same time to open the valve $E^{10}$, which will permit the steam or air in the cylinders and pipes to flow out through nozzle $E^9$ into the atmosphere or into a pipe for conducting it to any desired locality.

The above-described valve makes ample provision for operating the brakes, it being easily changed from one position to another; but I wish it understood that I do not limit my combination to that particular form of valve, as any other form may be used that will properly perform the function of permitting steam or air to pass to and from the brake-cylinders at the required period of time.

In Figs. 9 and 10 I have shown what I regard as modified forms of mechanism for applying the brakes to the driving-wheels of an engine, the principle and mode of operation being the same as that above described, the only change consisting in the arrangement of the levers and rods which operate the brake-blocks, while the combination is not changed. Such being the case, I have not thought it necessary to minutely describe the forms of the parts employed in the modifications further than to show them by drawings.

I am also aware that cylinders for operating brakes have been secured to the tender and locomotive frame jointly. Such a construction I do not claim, broadly; but in my invention the great advantage of securing the cylinders to the frame of engine and operating the brakes directly against the wheels of the engine and tender is that if a wheel of the tender breaks (which often occurs) or the tender in any way becomes disabled the action of the cylinders on the brakes is maintained without interruption, and the train is stopped and held under control by the engineer. The cylinders are less liable to displacement when secured to the frame of the engine, and are held more rigid and firm, while their action is direct and certain.

Having thus described my invention, what I claim, and desire to secure by Letters Patent, is—

1. The herein-described mechanism for simultaneously operating brakes upon the driving and truck wheels of a locomotive and its tender, operating by the combined action of three or more steam or air pressure cylinders located upon the frame of the engine, the flow of motive force to and from them being controlled by a single valve, and is conducted through a pipe having branches leading to each cylinder or through a series of pipes connected to said valve, they being arranged to conduct the steam or air from the boiler or air-reservoir to the cylinders, and from said cylinders back to the same valve and out into the atmosphere, the application of the brake-shoes to the various wheels being by an arrangement of levers and rods substantially such as shown and described.

2. The combination, in a brake mechanism for applying the brake-shoes to both sides of the driving-wheels of a locomotive-engine, of a steam or air pressure cylinder, a piston and its rod A, the adjustable levers $A^6$ $A^6$, for adjusting the resisting force equally to the front and rear portions of the wheels, the adjustable connecting-rods $A^9$ $A^9$, levers $A^{11}$ $A^{11}$, and shoes $A^{10}$, applied to the front and rear of said wheels, substantially as and for the purpose set forth.

In testimony whereof I affix my signature in presence of two witnesses.

CHARLES W. LAUPHER.

Witnesses:
C. W. GRANT,
H. T. OWEN.